(12) United States Patent
Muntasser (10) Patent No.: US 10,180,154 B2
(45) Date of Patent: Jan. 15, 2019

(54) MARKER HOLDER

(71) Applicant: Emadeddin Zahri Muntasser, Braintree, MA (US)

(72) Inventor: Emadeddin Zahri Muntasser, Braintree, MA (US)

(*) Notice: Subject to any disclaimer, the term of this patent is extended or adjusted under 35 U.S.C. 154(b) by 79 days.

(21) Appl. No.: 15/158,990

(22) Filed: May 19, 2016

(65) Prior Publication Data

US 2017/0089376 A1    Mar. 30, 2017

Related U.S. Application Data (63) Continuation-in-part of application No. 14/867,097, filed on Sep. 28, 2015, now Pat. No. 9,850,925.

(51) Int. Cl.

| | |
|---|---|
| *F16B 2/04* | (2006.01) |
| *F16B 2/08* | (2006.01) |
| *F16B 9/02* | (2006.01) |
| *F16B 7/04* | (2006.01) |
| *F16B 2/06* | (2006.01) |

(52) U.S. Cl.
CPC ............ *F16B 9/023* (2013.01); *F16B 7/0486* (2013.01); *F16B 9/026* (2013.01); *F16B 2/04* (2013.01); *F16B 2/065* (2013.01); *F16B 2/08* (2013.01)

(58) Field of Classification Search
CPC .. F16B 9/02; F16B 9/023; F16B 9/026; F16L 1/11; F16L 57/00; G01V 15/00; G09F 3/16; G09F 19/22; G09F 19/228
USPC ............. 116/209; 33/1 G, 1 H; 285/252, 253
See application file for complete search history.

(56) References Cited

U.S. PATENT DOCUMENTS

| | | | |
|---|---|---|---|
| 2,188,710 | A | 1/1940 | Giovanini et al. |
| 2,555,303 | A | 6/1951 | Collins |
| 2,653,836 | A | 9/1953 | Christophersen et al. |
| 2,667,318 | A * | 1/1954 | Sesler ................. H01Q 1/1221 248/517 |
| 3,064,327 | A | 11/1962 | Kaplan |
| 3,099,054 | A | 7/1963 | Spiro |
| 3,110,948 | A | 11/1963 | Voss |
| 3,463,428 | A | 8/1969 | Kindorf et al. |
| 4,381,020 | A | 4/1983 | Daghe et al. |
| 7,516,575 | B2 * | 4/2009 | Cuccurullo ......... E04D 13/0335 182/113 |
| 7,712,237 | B2 | 5/2010 | Wortley et al. |
| 8,424,821 | B2 * | 4/2013 | Liu ......................... E04D 13/12 248/237 |

(Continued)

FOREIGN PATENT DOCUMENTS

| | | |
|---|---|---|
| WO | 2011091135 | 7/2011 |
| WO | 2011094808 | 8/2011 |

*Primary Examiner* — R. A. Smith
(74) *Attorney, Agent, or Firm* — Lambert Shortell & Connaughton; Gary E. Lambert; David J. Connaughton, Jr.

(57) ABSTRACT

A marker assembly is provided. The marker assembly is attachable to a roof or roof element to alert a worker to potential hazards nearby. For example, the marker assemblies may be attached to a roof, such as a corrugated roof, adjacent to four corners of a skylight, to alert a worker that the skylight may be nearby, particularly in the event that it may be buried or otherwise hidden or obscured. A transmitting beacon within the marker holder which may provide an output signal receivable by a computerized receiver. Upon receipt of the output signal by the computerized receiver, the computerized receiver can provide a notifying output.

13 Claims, 10 Drawing Sheets

(56) References Cited

U.S. PATENT DOCUMENTS 8,595,992 B2    12/2013  May et al.
8,833,714 B2 *  9/2014  Haddock et al. ...... F24J 2/5249
                                                        248/237

\* cited by examiner

Marker - Transmitting Beacon ➜ Receiver - Notifying Output

Fig. 12

MARKER HOLDER

BACKGROUND OF THE INVENTION

Field of the Invention

The present invention relates generally to marking devices. More particularly the present invention relates to a fastener having a receiving area for a marker that can extend through snow, or other coverings, to identify what is beneath or near an object or obstruction.

Description of Related Art

During heavy snow falls, it is common for structural elements such as pipes, housings, access panels, wiring, components, skylights, and the like to be buried. This burying can be caused by falling leaves, soil, snow, other debris, and the like. When buried, these items may become damaged, often substantially if they cannot be seen. This damage may come from, for example, snow removal devices like shovels, blowers, or plows, or by other tools such as rakes, and the like. Contractors and workers making repairs to roofs or fixtures or shoveling snow can trip on these obstructions or even fall to their death through skylights that can be covered with snow. Punctured gas pipes are a major safety and fire hazard. In other applications, such as metal roofs, translucent skylights are made flush with the roof and become very difficult to be seen even when not covered. Workers frequently step into and fall through such translucent skylights when working on roofs.

Therefore, what is needed is a device that may be quickly and easily attached to these potentially buryable or difficult to see structural elements to extend through any burying material to mark that the structural elements are below or to add visibility to structural elements that are not easily seen.

SUMMARY OF THE INVENTION

The subject matter of this application may involve, in some cases, interrelated products, alternative solutions to a particular problem, and/or a plurality of different uses of a single system or article.

In one aspect, a marker holder is provided. The marker holder has a base, and a holder attached to the base. The base may be any material capable of attachment to a roof, such as a metal roof. The base, in a particular embodiment, may be connectable to a protrusion on a corrugated or flat metal roof. A marker is held within the holder, the marker extending away from the base, such that the marker extends from the roof that it is attached to. In one embodiment, the marker holder may be placed adjacent to a skylight, flat roof smoke ventilation windows, and the like. The marker holder may be placed, for example, about a perimeter of the skylight, to alert a roof worker that there is a dangerous and unsupportive element by the markers.

In another aspect, a worm clamp marker holder assembly is provided. The assembly includes a worm clamp attached to a pipe, a holder attached to the worm clamp, and a marker held by the holder extending away from the pipe. The worm clamp may have a band, a captive screw connected to a first end of the band, and a pattern formed into the band that is interfacable with the captive screw. Upon interfacing of the second end of the band with the captive screw, a rotation of the screw passes the band across the captive screw, thereby tightening the band. A marker is held within the holder, the marker extends away from the worm clamp and the pipe, such that the marker may extend through any burying material, such as snow, leaves, and the like, allowing visible identification of the buried pipe below. Further still, the marker may be used simply to identify of a potentially hazardous element such as a skylight.

In still another aspect, a method of connecting a worm clamp marker holder assembly to a pipe is provided. The method may begin with obtaining a worm clamp marker holder, which may have a band, a marker holder attached to the band, a captive screw connected to a first end of the band, and a pattern formed into the band that is interfacable with the captive screw. Upon interfacing of the second end of the band with the captive screw, a rotation of the screw passes the band across the captive screw, thereby tightening the band. A marker is also obtained. The worm clamp marker holder may be connected to a pipe or similar structural element, and the marker may be slideably positioned within the holder. This slideable connection of the marker to the holder allows the marker to extend through any burying material, such as snow, leaves, and the like, allowing visible identification of the buried pipe below. In other applications, white PVC piping is being used on top of white-coated roofs. The increasingly popular white coatings are used in hot climates for added energy efficiency. With such white on white application, pipes blend with the roof material and become dangerously invisible. This marker holder could easily attach around such PVC piping for identification and warning.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a clamp and marker assembly configured to be fastened or otherwise attached to a buried, or buryable pipe or other elongate element, with the marker extending out of the burying material. In one embodiment, the clamp and marker assembly may have a clamping region formed as a worm clamp (also known in the art as a screw clamp, hose clamp, or band clamp), a holder attached to the worm clamp, and an elongate marker held by the holder extending away from the clamp. The holder may be formed as any number of connection structures, allowing it hold varying marker structure in varying directions. As such, the marker may be able to extend out of the burying material at multiple different angles and directions. However, it should be understood that the present invention may have any number of structures to achieve a similar function without straying from the scope of the invention.

Figure 1:
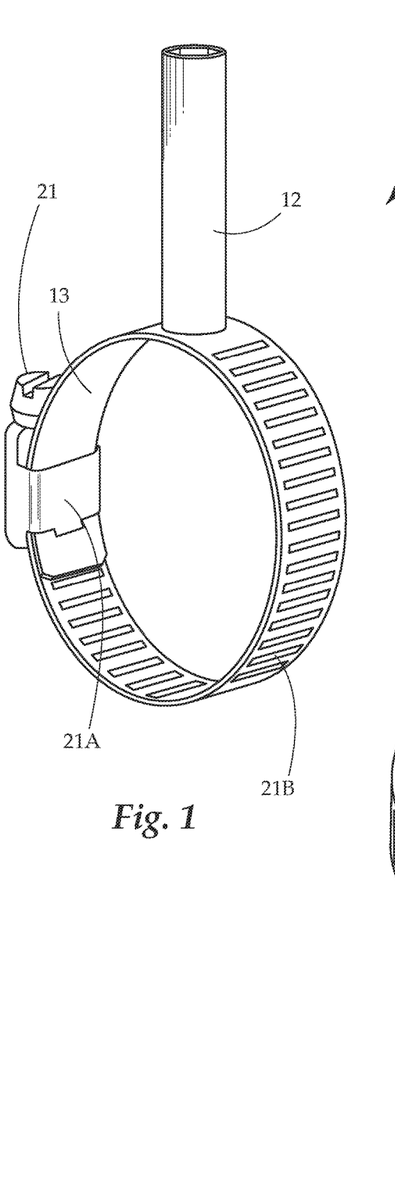
FIG. 1 provides an elevation view of one embodiment of the present invention.
Figure 2:
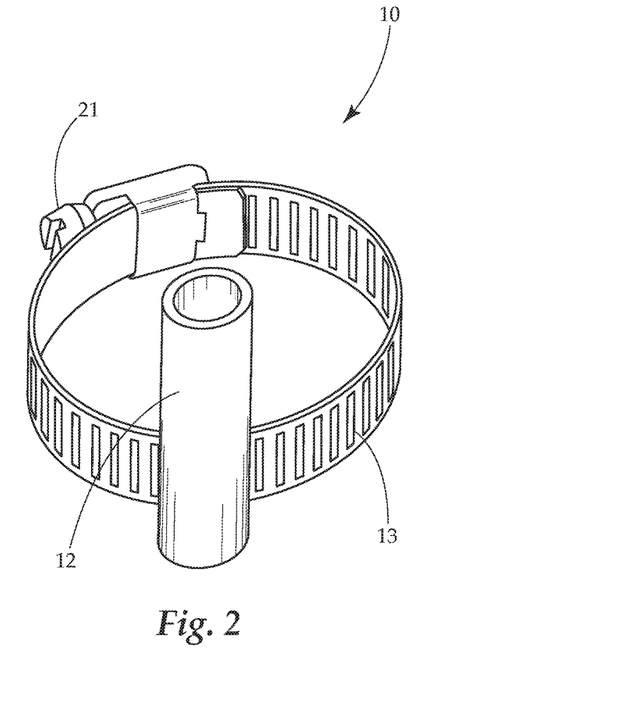
FIG. 2 provides an elevation view of another embodiment of the present invention.
Figure 3:
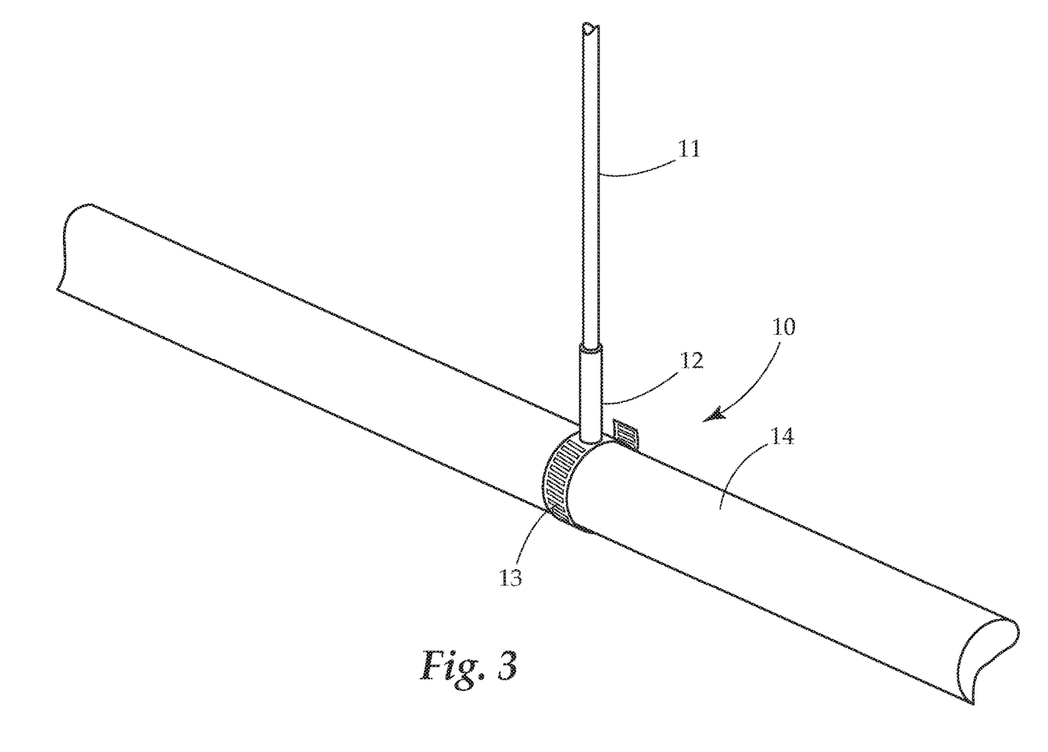
FIG. 3 provides a perspective view of an embodiment of the present invention.

Turning now to FIGS. 1-3, an embodiment of the worm clamp marker holder assembly is provided. The worm clamp marker holder 10 is formed of a worm clamp 13, and a holder 12 fixedly attached to the worm clamp. The worm clamp marker holder 10 can be seen attached to a rounded pipe 14 in FIG. 3. While the clamp is shown in the figures as a worm clamp, it should be understood that any clamp may be used without straying from the scope of the present invention.

The holder 12 is sized and configured to receive and hold a marker 11. In one embodiment, holder 12 may be oriented perpendicularly to the pipe to which it may attach, as shown in FIGS. 1 and 3. In another embodiment, holder 12 may be oriented parallel to the pipe to which it may attach, as shown in FIG. 2. Further, it should be understood that holder 12 may be oriented at any relative direction to the pipe, such that the marker 11 held therein extends away from the pipe or other buryable element and out of any burying material. Holder 12 may be welded, clamped, or otherwise attached to the worm clamp 13 in any manner.

In some embodiment, marker 11 will fit into the holder 12 until it reaches a bottom or other stop, and cannot pass any further. In still other embodiments, the marker 11 may attach to the holder in other manners such as threaded attachment, clamps, stoppers, and the like. Marker 11 is shown herein as an elongate shaft element. Similarly, holder is shown as a rounded cylinder that forms an elongate aperture to receive the marker 11. In other embodiments having differently shaped or configured markers, the holder may similarly adjust. For example, an elongate marker having a square cross section may be held by a holder having any aperture capable of holding this shaped marker (whether it is a circle, square, hex shape or the like).

The worm clamp 13 of the present invention may operate as a traditional worm clamp would. Specifically, the worm clamp 13 has a band 21a into which a screw thread pattern, or other pattern interfacable with a screw has been cut or pressed. One end of the band 21a contains a captive screw 21 attached to the band at 21b. The clamp 13 is put around the pipe, tube, or other buryable element to which it is to be connected, with the loose end being fed into a narrow space between the band 21b and the captive screw 21. When the screw is turned, it acts as a worm drive, pulling the threads of the band 21, causing the band to tighten around the buryable element. When screwed the opposite direction, the band may loosen. Once attached to the pipe 14 or other element, marker 11 may be connected via holder 12, forming the worm clamp marker assembly embodiment shown in FIG. 3.

Figure 4:
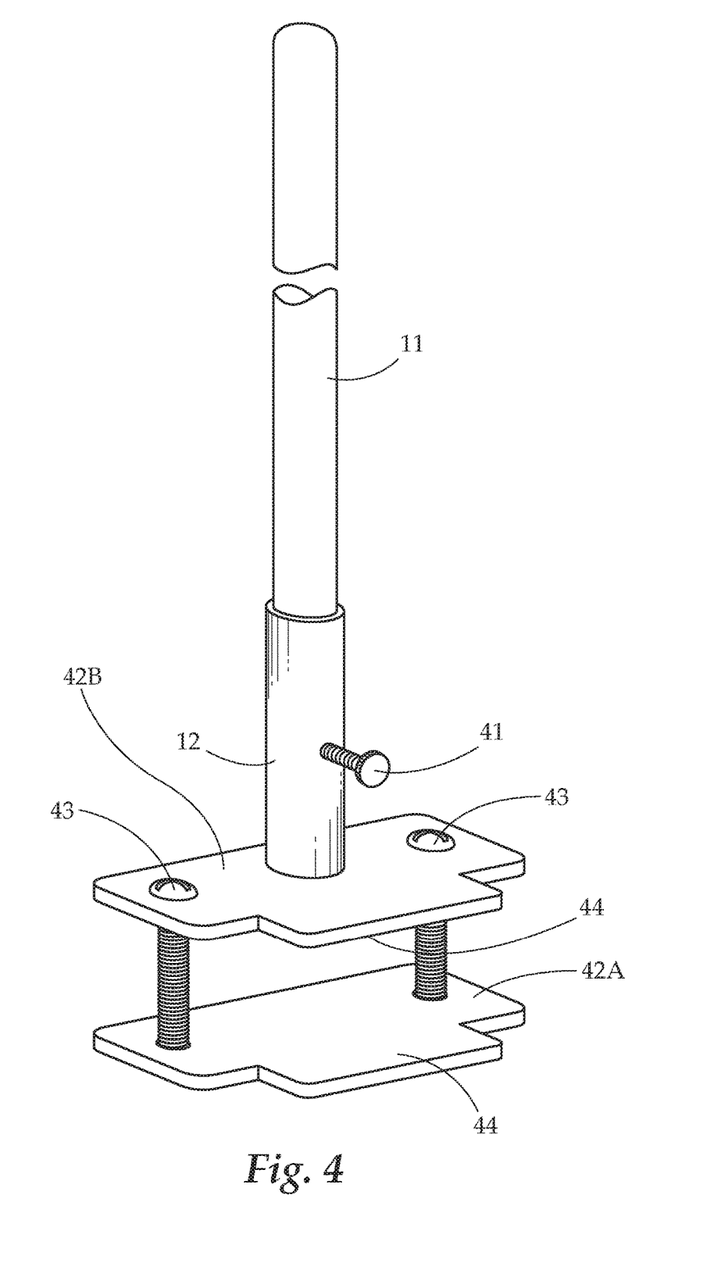
FIG. 4 provides an elevation view of still another embodiment of the present invention.

FIG. 4 provides a view of another embodiment of the present invention. In this view, a flat clamp is shown. The flat clamp has plates 42a and 42b configured to be connected in a clamping fashion by screws 43. An item to which the clamp will be attached is placed between plates 42a and 42b. Holder 12 which is has a tubular shape is attached to upper plate 42b (though could be attached to either). A marker 11 slideably fits into the holder 12 and may be held in place by a screw 41. In some embodiments, one or both plates 42a, 42b may have a lip 44 extending from them. The lip 44 aids in attachment to flat surfaces.

Figure 5:
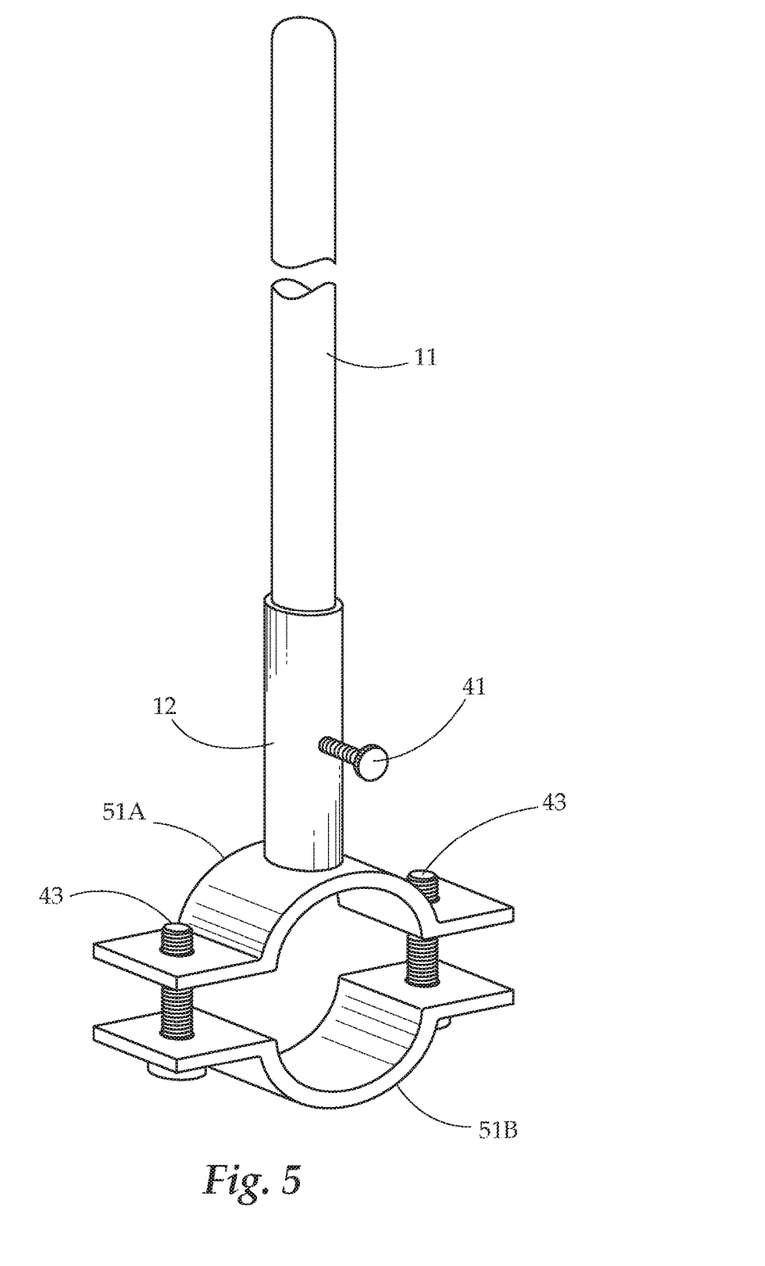
FIG. 5 provides an elevation view of yet another embodiment of the present invention.

FIG. 5 provides a view of another embodiment of the present invention. In this view, a pipe clamp is shown. The pipe clamp has curved plates 51a and 51b configured to be connected in a clamping fashion by screws 43. A pipe to which the clamp will be attached is placed between plates 51a and 51b. The curvature of the plates 51a, 51b should be selected to be roughly sized to match the pipe to which it will be attached, so that the curves may rest on the surface of the pipe. Holder 12 which is has a tubular shape is attached to upper plate 51a (though could be attached to either). A marker 11 slideably fits into the holder 12 and may be held in place by a screw 41.

The worm clamp holder may be made of any material or combination of materials resilient enough to be attached to a surface and to hold a marker in place to extend away from the fastener. Generally, the present invention may be made of metals, plastics, composites, woods, and the like.

The worm clamp holder of the present invention may be used in any manner capable of attaching the fastener to an element and allowing a marker to extend away from the element. In a particular embodiment, the worm clamp may be attached to a pipe and tightened down by screwing (or otherwise rotating) the worm clamp tight. Once secured in place to the pipe, a marker can be inserted into the holder, the marker sized and oriented such that it extends upwards away from the pipe through any burying material.

Figure 6:
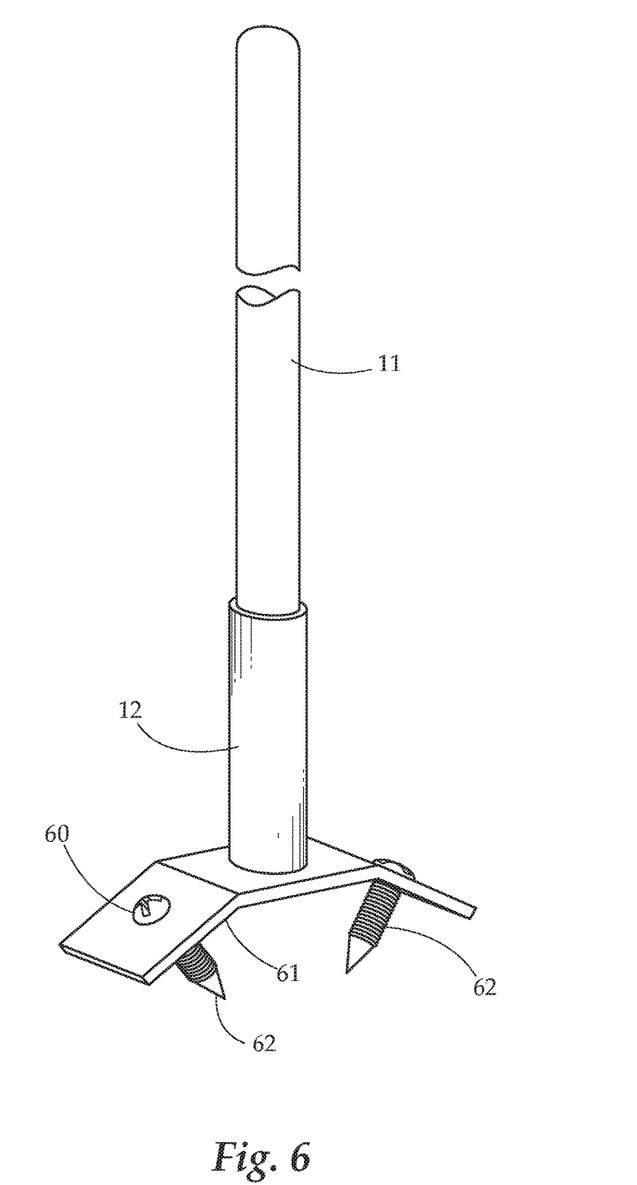
FIG. 6 provides a side view of another embodiment of the present invention.

Further, turning to FIG. 6, another embodiment of the marker holder is provided. This embodiment of the marker holder is designed for attachment to a corrugation protruding from corrugated metal sheets such as a metal roof panel. Accordingly, base 60 has a flat central portion, and downward angled sides. This shape will correspond to the corrugation protrusion from the metal roof panel. A holder 12 extends upward from a top of the base 60. Into the holder 12, a marker 11 may be attached—in this view attached by sliding into the holder 12. It should be understood that marker 11 and holder 12 may be any configuration that allows marker 11 to be held in place to extend away from the body without straying from the present invention.

Two screws 62 extend from a bottom of the base 60 to attach the base 60 to the roof corrugation on either side of the holder 12. In one embodiment, the screw 62 may be positioned inside holder 12 (which is, in this embodiment, a hollow elongate cylinder) such that the screw 62 is coaxial with the holder 12. In another embodiment, the screw or screws 62 may be laterally offset from the holder 12, as in the embodiment shown. Washer 61 may be positioned on a bottom of the base 60. Washer 61 may be formed of a material configured to protect the roof from the base, for example the washer 61 may be formed of a plastic or rubber material, but is not limited to such materials. This embodiment may be used to directly attach the base to a roof to flag an element below or nearby, in the event that such an element may be covered or obscured. Even if exposed, the marker 11 will make the element more visible.

Figure 7:
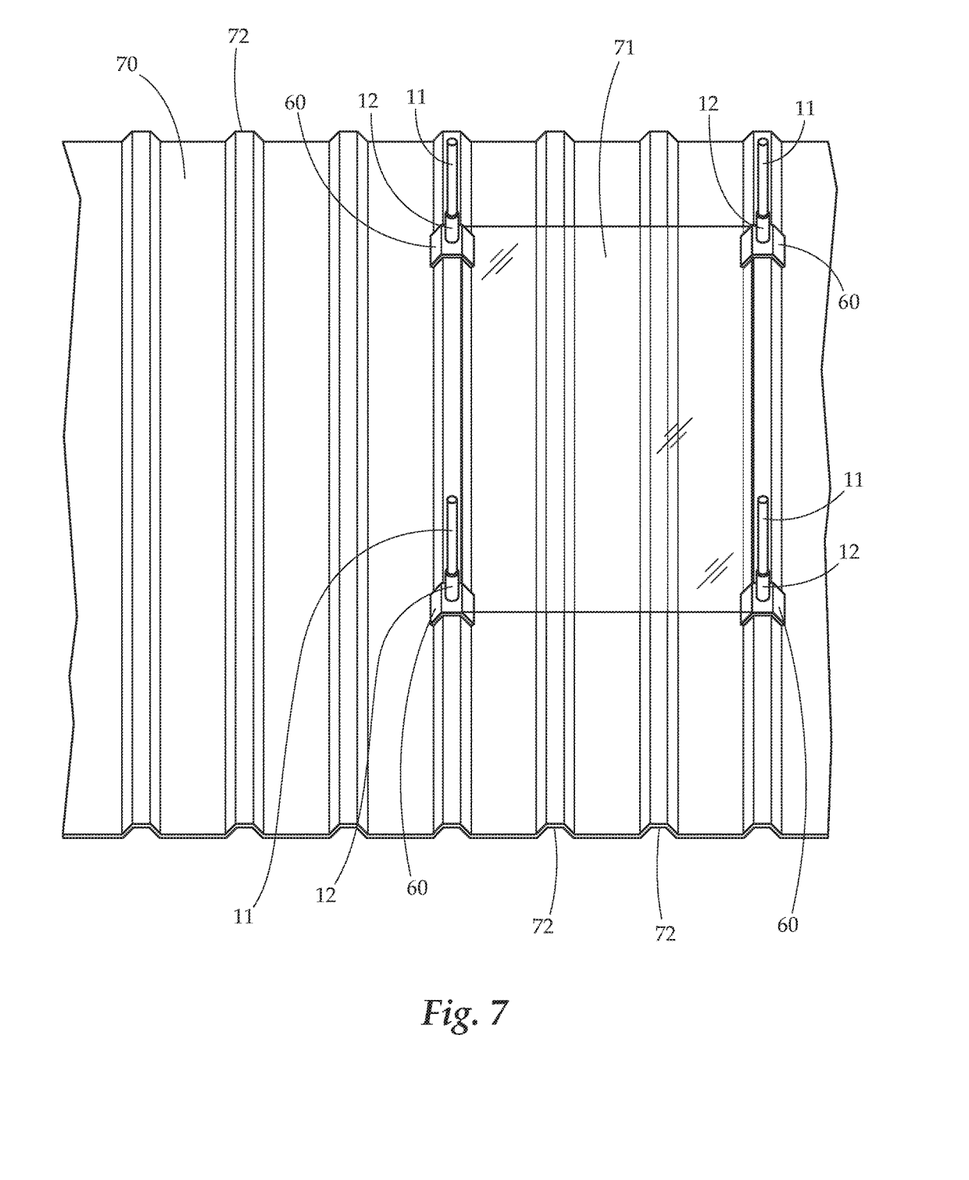
FIG. 7 provides a perspective view of an embodiment of the invention on a roof.

FIG. 7 provides a view of the marker holder embodiment of FIG. 6 in use on a roof. Roof 70 is formed of a corrugated metal and plastic material. However, it should be understood that in other embodiments, flat, non corrugated surfaces may be used as the roof and/or skylight without straying from the scope of the present invention. The roof 70 contains a plastic corrugated skylight 71 portion. This skylight 71 is not as rigid and supportive as the metal roof 70 and therefore if a worker steps on the skylight 71, he or she could fall through. Corrugations 72 protrude from the roof 70 as part of its structure. Markers are attached to these corrugations 72 adjacent to skylight 71. Marker body 60 is attached to the corrugation 72 via screw (not shown) at or near the corners of the skylight 71. Holder 12 attached to body 60 holds marker 11, extending away from the roof and warning that the skylight 71 is nearby or underneath. This may indicate a potential hazard, making it easier to see even if uncovered, or if there is any covering material that may be hiding it.

Figure 8:
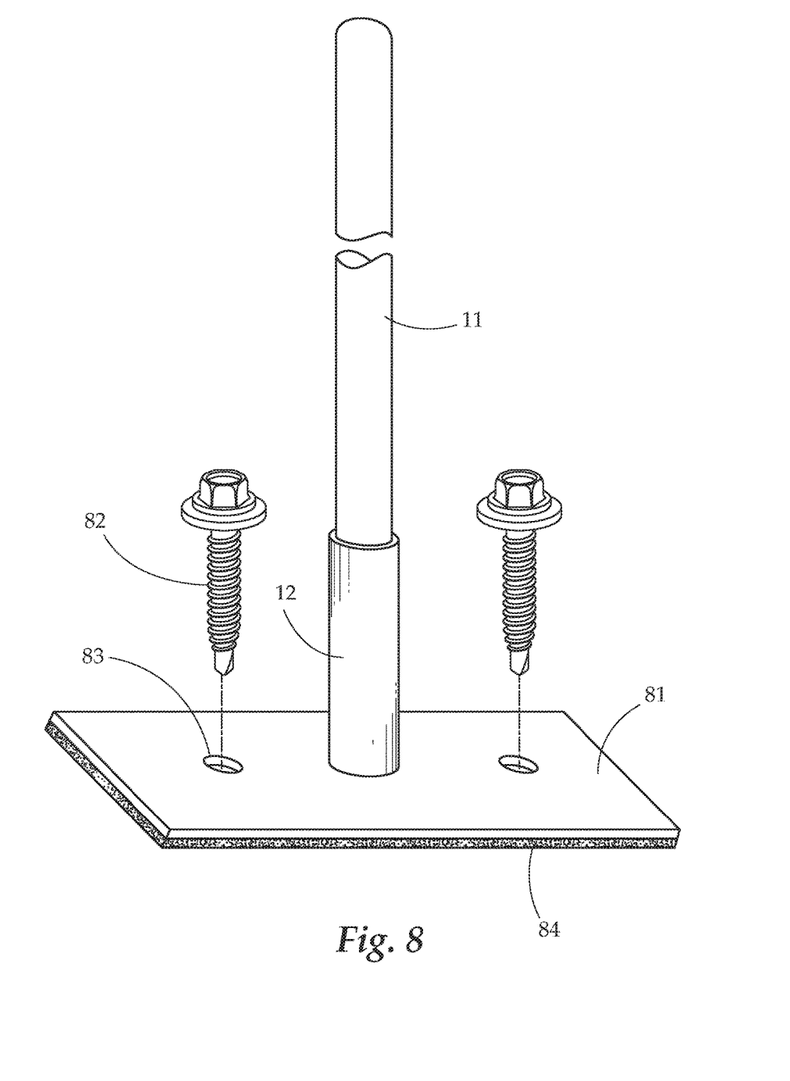
FIG. 8 provides a perspective view of yet another embodiment of the present invention.

FIG. 8 provides another embodiment of the marker holder. In this view, base 81 is flat and is configured to attach to a flat roof or a flat portion of a roof. Base 81 has a gasket 84 formed of a flexible material such as rubber, plastic, and the like. Base 81 defines openings 83 through which screws 82 may pass to anchor the base 81 to roof. The embodiment of this figure may be advantageous to mark sky lights on flat roofs or in areas where the marking area is flat. Further, this embodiment, as with other embodiments, may be useful for marking other hazards that may occur on a rooftop.

Figure 9:
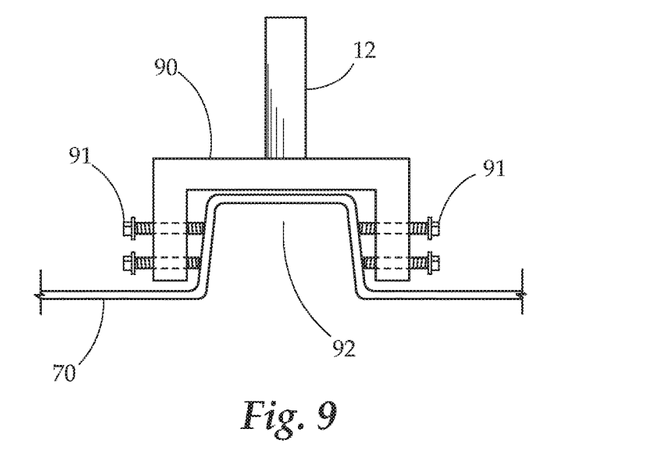
FIG. 9 provides a perspective view of still another embodiment of the present invention.

FIG. 9 provides another alternative embodiment of the present invention configured to attach to a roof corrugation. In this embodiment, base 90 has two sides that extend downward over a corrugation 92 of a roof 70. These depending portions define openings through which screws 91 may extend. These openings may be threaded to allow screws 91 to act as tension screws to clamp down on both sides of the corrugation 92 in a closed mode, and to release from the corrugation 92 in an open mode.

Figure 10:
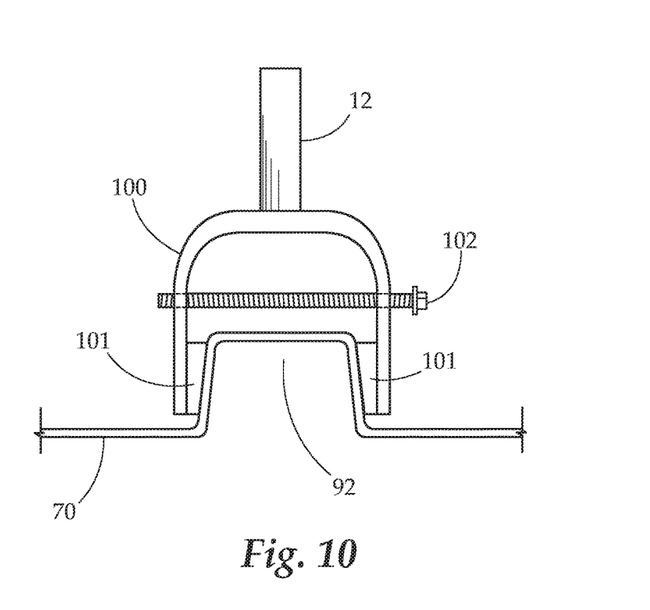
FIG. 10 provides a perspective view of yet still another embodiment of the present invention.

FIG. 10 provides yet another embodiment of the present invention. In this embodiment, base 100 has two sides that extend downward over a corrugation 92 of a roof 70. A tensioning screw 102 extends from one side to another, passing through both via oppositely threaded openings. Upon a tightening of screw 102, the sides are drawn closer together, such that pads 101 are urged against the sides of the corrugation 92, thereby holding the marker holder in place. To release the marker holder from the corrugation 92, the screw may be reversed, moving the pads 101 away from each other.

Figure 11:
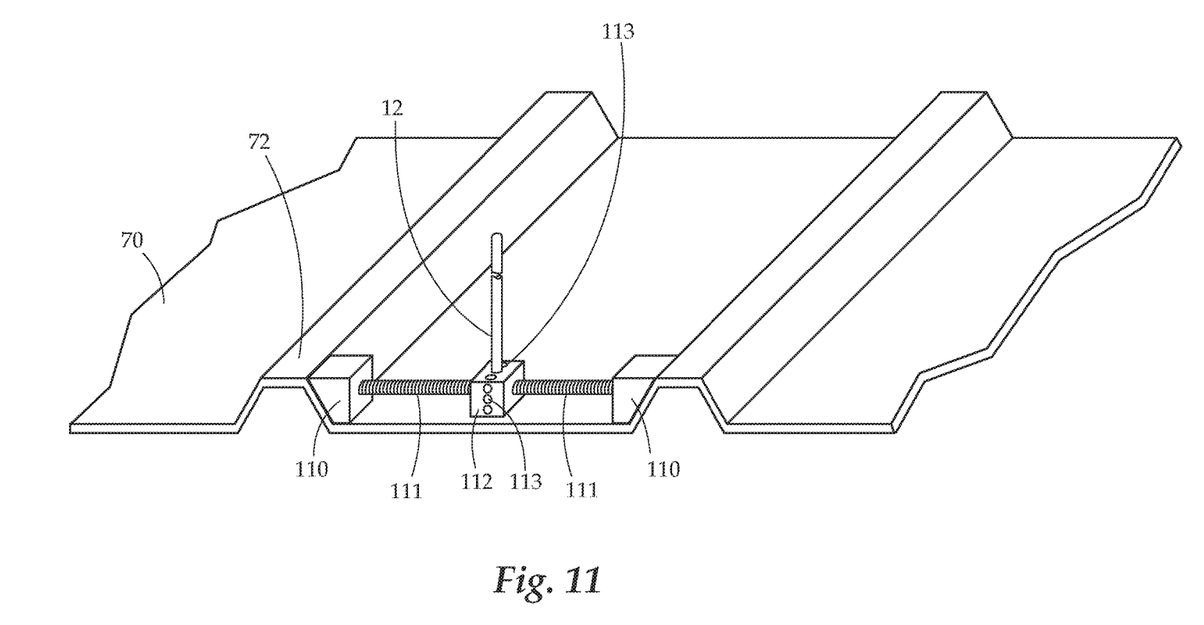
FIG. 11 provides a view of another embodiment of the present invention in use on a roof.

FIG. 11 provides still another embodiment of the marker holder of the present invention. In this view, a base 112 of the marker holder is connected to either one extending shaft 111 or two separate extending shafts 111. These shafts may extend and retract via, for example, threaded connections to one of the base 112, or end blocks 110. Because the two shafts are threaded in two opposite directions, the shafts will extend out together or retract in together depending on the direction of the rotation. In operation, shafts 111 are extended outward until tensioning blocks 110 against sides of adjacent corrugations 72 of the roof 70. Blocks 110 have an angled leading edge that may align with the angled faces of the corrugations 72. Extending of the shaft 111 may be achieved by, for example, a threaded shaft 111 rotating with respect to one of the base 112 and/or blocks 110. Shafts 111 may in some embodiments comprise a nut, or other holding area to allow for easy rotation. In further embodiments, base 112 may rotate, which may urge shaft(s) 111 outward urging blocks 110 against the corrugations 72, locking the marking device in place. In this view, a plurality of holders 113 are formed as holes in the base 112. Three holders 113 are on each side, the outer holders being angled away from each other, and the central holder being perpendicular to the base face that it is on. As such, as the base 112 may be rotated, the marker may always face generally upwards depending on which holder 113 it is inserted into that faces most-upwards.

The marker used in any of the embodiments may further be equipped with additional elements to enhance its visibility. For example, one embodiment of the marker may comprise a solar powered LED that may, for example, illuminate at night, at all times, may flash, and the like.

In another embodiment, the marker may be equipped with a proximity sensor. The proximity sensor may be configured to detect the presence of a worker, such as by motion, sound, vibration, or the like. In one embodiment, this proximity sensor may be self-contained. The proximity sensor may then provide a notice such as a flashing light or audible alarm to further warn a nearby worker of a potentially dangerous element nearby. In another embodiment, the proximity may send a warning signal to a smartphone.

In a further embodiment, a beacon, or beacon like device may be used or attached to the marker or marker holder. This beacon may provide data and/or warnings to an operator nearby. In one embodiment, the beacon may be a Bluetooth® smart beacon that may provide simultaneous advertising on multiple bandwidths. The beacon may have multiple built-in sensors such as temperature, motion, light, and/or magnetometers, and may transmit this sensed information to a connected computing device. In use, a user may be alerted to proximity to the marker and accordingly the hazard by a warning provided by, for example, a smartphone or other specialized computing device in communication with the beacon.

Figure 12:
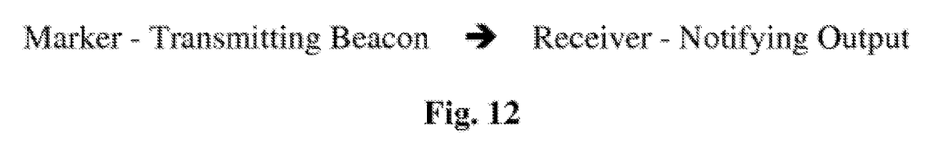
FIG. 12 provides a block chart showing an embodiment of operation of the transmitting beacon of the marker holder.

In some embodiments, such as that shown in FIG. 12 beacons may record and transmit multiple data components sensed. In a particular embodiment, in the case of a large snow drift, storm, or other event that brings many feet of snow very quickly to a section of a roof, the roof will bend or sag slightly before it collapses. The beacon may be configured to sense a height of snow around it, as well as any bending in the roof as a result of the added weight. If such readings rise above a predetermined level, the beacon may provide an output signal to a computerized device in networked communication with the beacon. Safety personnel, building managers, and the like may receive a warning from the computerized device, and snow clearing or other operations may begin to prevent further damage.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A marker holder comprising:
 a base, the base configured to attach directly to a roof;
 a holder attached to the base, the holder extending from a top of the base; and
 a marker held within the holder, the marker extending away from the base;
 a transmitting beacon, the transmitting beacon providing an output signal receivable by a computerized receiver, and wherein upon receipt of the output signal by the computerized receiver, the computerized receiver provides a notifying output.

2. The marker holder of claim 1 wherein the base is configured to attach directly to a corrugation of the roof.

3. The marker holder of claim 2 wherein the base is shaped with a bottom surface having a flat center and downwardly angled sides.

4. The marker holder of claim 1 further comprising a screw connecting the base to the roof, the screw positioned coaxially with the holder.

5. The marker holder of claim 1 further comprising a screw connecting the base to the roof, the screw positioned adjacent to the holder.

6. The marker holder of claim 1 further comprising a screw connecting the base to the roof, the screw positioned to be laterally offset from the holder.

7. The marker holder of claim 1 further comprising a washer attached to a bottom of the base, the washer configured to provide a spacing between the roof and the base.

8. The marker holder of claim 7 wherein the washer is one of a plastic or a rubber.

9. A marker assembly comprising the marker holder of claim 1 and further comprising a screw connecting the base to the roof at a protruding corrugation of the roof adjacent to a skylight portion of the roof.

10. A marker assembly comprising the marker holder of claim 1 and further comprising a screw connecting the base to the roof adjacent to a skylight portion of the roof.

11. The marker holder of claim 1 further comprising two depending edges on opposite widthwise edges of the base, each of the depending edges configured to extend over a corrugation of the roof.

12. The marker holder of claim 11 further comprising a first screw threadedly passed through a first of the two depending edges, and a second screw threadedly passed through a second of the two depending edges.

13. A marker holder comprising:
a base, the base configured to attach directly to a roof;
a holder attached to the base, the holder extending from a top of the base; and
a marker held within the holder, the marker extending away from the base;
a shaft extending laterally from the base, a first block attached to a first end of the shaft, a second block attached to a second end of the shaft, wherein the shaft and block assembly is extendable and retractable in length, and wherein each of the first and second block are configured to be urged against opposing corrugations of the roof.

* * * * *